United States Patent [19]
Tian-Song

[11] Patent Number: 5,143,527
[45] Date of Patent: Sep. 1, 1992

[54] WASTE GAS-PURIFYING DEVICE

[76] Inventor: Guo Tian-Song, 80-3, Ryh Nan RDg330201, Dah-Jea Town, Tai-Jong Shian, Taiwan

[21] Appl. No.: 690,304

[22] Filed: Apr. 24, 1991

[51] Int. Cl.$^5$ .................. B01D 47/02; B01D 47/12
[52] U.S. Cl. ............................ 55/222; 55/247; 55/256; 55/267; 55/DIG. 30; 261/DIG. 9
[58] Field of Search ................ 55/222, 228, 235, 247, 55/255, 256, 257.7, 267, 269, DIG. 30; 261/DIG. 9; 165/122; 417/372

[56] References Cited

U.S. PATENT DOCUMENTS

| | | | |
|---|---|---|---|
| 468,408 | 2/1892 | June et al. | 55/256 |
| 581,448 | 4/1897 | White | 55/256 X |
| 1,032,536 | 7/1912 | Gerli et al. | 55/256 X |
| 1,223,684 | 4/1917 | Fleming | 55/256 |
| 1,253,939 | 1/1918 | Clarke | 55/256 |
| 1,374,689 | 4/1921 | Torrey | 55/256 X |
| 1,603,507 | 10/1926 | Beveridge | 55/256 X |
| 1,736,470 | 11/1929 | Torrey | 417/372 |
| 1,814,582 | 7/1931 | Benkert et al. | 55/255 X |
| 1,964,794 | 7/1934 | Gilbert | 55/256 X |
| 2,321,097 | 6/1943 | Mills | 417/372 |
| 2,612,745 | 10/1952 | Vecchio | 55/222 |
| 3,276,189 | 10/1966 | Sylvan | 55/235 X |
| 3,372,863 | 3/1968 | Bloom | 417/372 |
| 3,462,919 | 8/1969 | Zalman | 55/256 |
| 3,487,431 | 12/1969 | Forkner | 417/372 X |
| 3,520,113 | 7/1970 | Stokes | 55/256 X |
| 3,733,782 | 5/1973 | Hatchel | 55/256 X |
| 4,141,702 | 2/1979 | deVries | 55/257.7 X |
| 4,251,486 | 2/1981 | Sohda | 55/256 X |
| 4,284,609 | 8/1981 | deVries | 55/257.7 X |
| 4,585,398 | 4/1986 | Drake | 417/372 X |
| 4,718,831 | 1/1988 | Gensberger | 417/372 |
| 4,808,087 | 2/1989 | Tsutsui et al. | 417/372 X |
| 5,004,486 | 4/1991 | Chen | 55/256 X |

Primary Examiner—Robert Spitzer
Attorney, Agent, or Firm—Bacon & Thomas

[57] ABSTRACT

A waste purifying device employing an intermediate exhaust fan and a vacuum pump to suck the waste gas flowing from a waste gas source toward a chimney into at least one washing tank through a pipe line, the washing tank containing a washing liquid which can remove the particles or toxic gas in the waste gas, the purified gas being then discharged from the chimney.

7 Claims, 3 Drawing Sheets

WASTE GAS-PURIFYING DEVICE

BACKGROUND OF THE INVENTION

The present invention relates to a waste gas-purifying device suitable for industrial, family, or even automobile, autobike use, especially for the diesel oil-burning device which produces high concentration of waste gas, wherein before discharging from a chimney, the waste gas is sucked by a vacuum pump into a washing tank. The washing tank contains a washing liquid which can perform purifying process, such as sedimentation filtration, etc. After the content of the gas meets the environment protection requirement, the gas is discharged from the chimney.

In modern life, the quality of the environment is strictly required and the managements of air pollution, waste water and garbage have become very important affairs about which everybody is concerned. Respecting the air pollution, since waste gas is easy to spread and directly contact human body, people are much more worried about this problem. Therefore, various air-purifying devices are developed to elimination the problem of air pollution. However, most such conventional devices are complicatedly structured and the price and maintenance cost thereof are very high. Moreover, their purifying effect is limited and can not meet the requirements of people. As a consequence, the using rate of conventional air-purifying device is low.

SUMMARY OF THE INVENTION

It is therefore an object of this invention to provide a waste gas-purifying device suitable for industrial, family, or even automobile, autobike use, wherein when waste gas is produced, an intermediate exhaust fan and vacuum pump are used to guide the waste gas into a washing tank for filtration and sedimentation process. The washing tank contains a washing liquid which can be clean water or chemical agent capable of sufficiently mixing and reacting with the waste gas and minimizing the content of undesired components. The purified gas is then discharged into the ambient air. The present device is simply constructed and easy to be operated and the price and operating expense thereof are low. The device is suitable for general factory and family and can also serve as a pre-processing device of a large type of waste gas-processing equipment.

The present invention can be best understood through the following description and accompanying drawings wherein:

DETAILED DESCRIPTION OF THE PREFERRED EMBODIMENT

Figure 1:
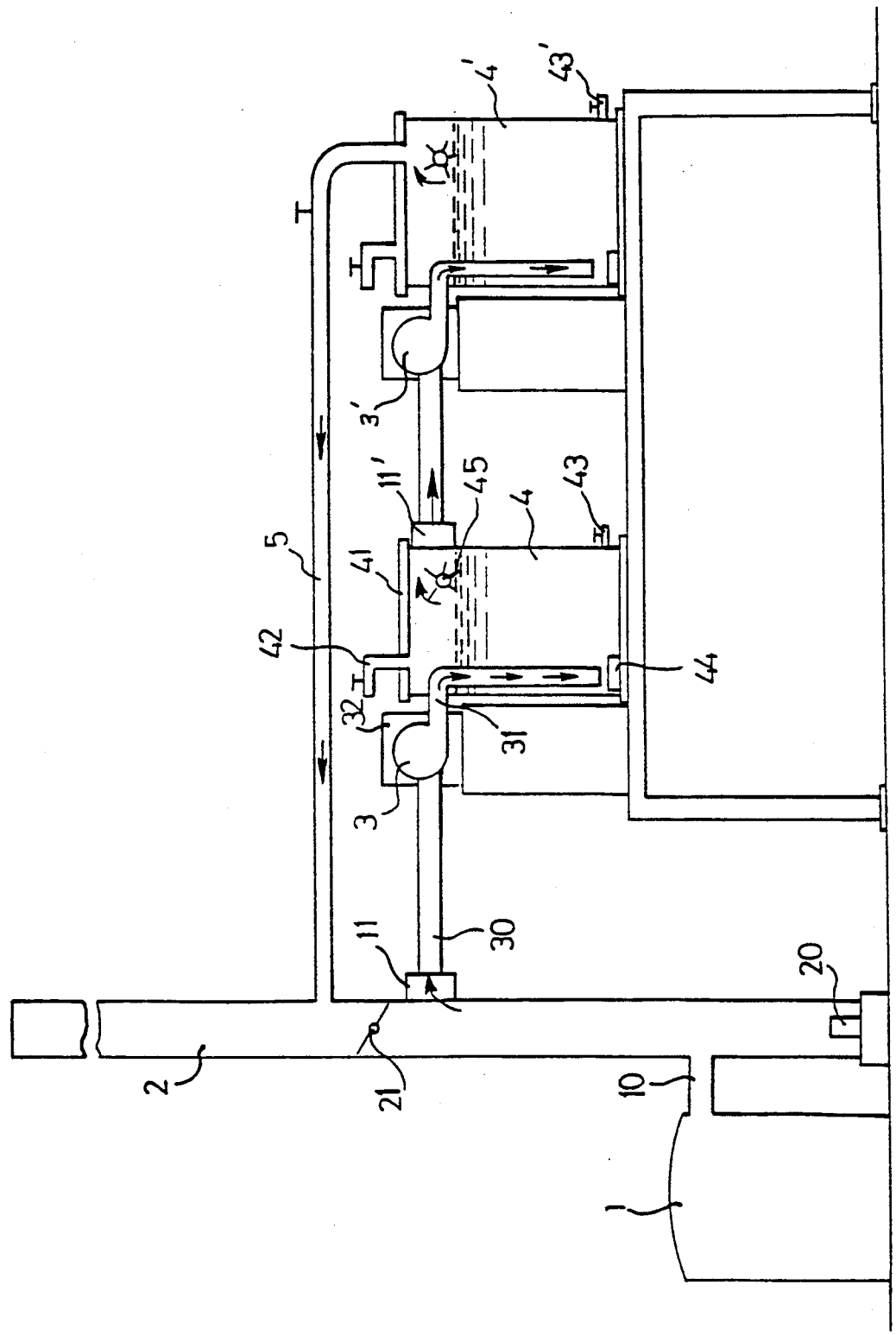
FIG. 1 is a plane view of the present invention.

Please first refer to FIG. 1. The waste gas-purifying device of this invention includes a vacuum pump 3, a washing tank 4 and a chimney 2. The waste gas can be forced into the washing tank 4 by the air pressure produced by the vacuum pump 3 for the purifying purpose. The chimney 2 is disposed beside the waste gas source 1 and communicated therewith by an exhausting pipe 10 so that the waste gas can directly enter the chimney 2. A stopper board 21 is disposed inside the chimney 2 for controlling the opening/closing of the passage of the chimney 2. An ash exit 20 is formed at the lower portion of the chimney 2 for cleaning up the chimney 2.

Figure 2:
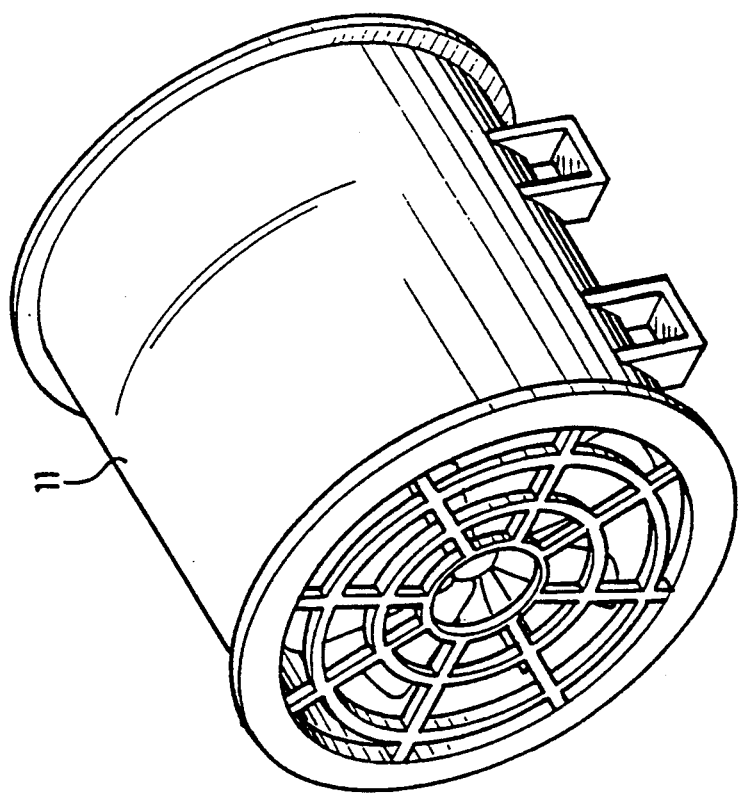
FIG. 2 is a perspective view of the intermediate exhaust fan of this invention.

An in-coming pipe 30 is connected with the chimney 2 under the stopper board 21 and an intermediate exhaust fan 11 is disposed on the in-coming pipe 30. The exhaust fan 11 can be of axial flow type as shown in FIG. 2 or of other suitable type for exhausting the waste gas in the chimney 2. The vacuum pump 3 is located at a position spaced from the exhaust fan 11 by a suitable distance. A discharging pipe 31 of the pump 3 is extended into the bottom of the washing tank 4. The lower end of the discharging pipe 31 is spaced from a bubble breaker 44 by a suitable distance. A cover 41 is disposed on the top of the washing tank 4 and a washing liquid introducing pipe 42 is provided on the cover 41 for supplementing the washing liquid. A drain pipe 43 is disposed on one side of the lower portion of the washing tank 4. A stirring propeller 45 is located in the tank 4 for directly stirring the washing liquid, making the same better mixed with the air or the guided in waste gas.

Figure 3:
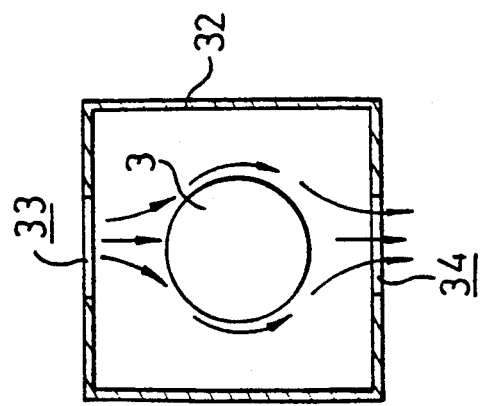
FIG. 3 shows the sprinkling type of the cooling device for the vacuum pump thereof.
Figure 6:
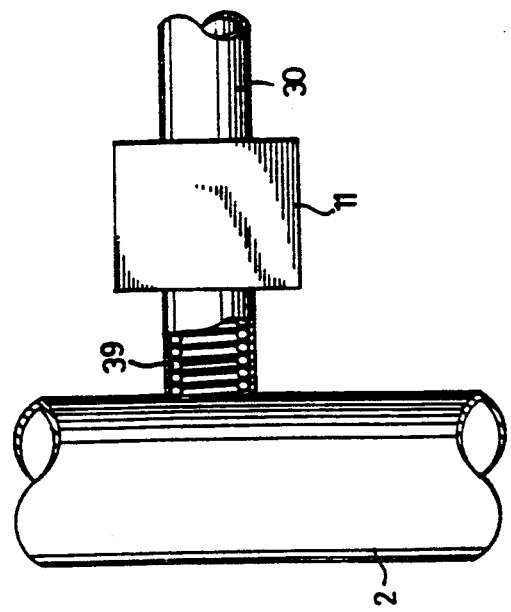
FIG. 6 shows the condensing pipe of the cooling device disposed in front of the vacuum pump.
Figure 5:
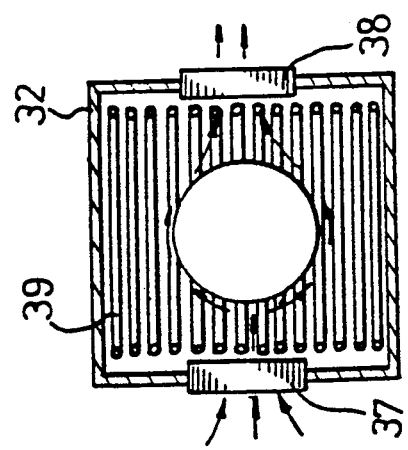
FIG. 5 shows the cooling air type of the cooling device for the vacuum pump thereof.
Figure 4:
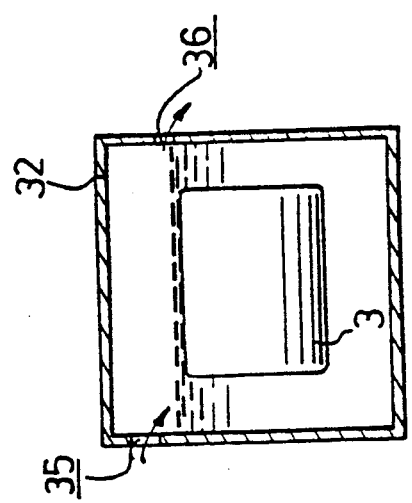
FIG. 4 shows the immersing type of the cooling device for the vacuum pump thereof.

According to the above arrangement, when the waste gas is produced from the waste gas source 1, it enters the chimney 2 and is stopped by the stopper board 21. At this time, the intermediate exhaust fan 11 is activated to suck the waste gas and the vacuum pump 3 is powered on to pressurize the waste gas, making the waste gas go through the in-coming pipe 30 and discharging pipe 31 and go into the washing liquid from the lower portion of the washing tank 4. Because the temperature of the waste gas is very high, therefore, under a long period of effect of high temperature, the insulating rubber surrounding the coil of the motor in the vacuum pump 3 may be molten to cause short-circuit and damage thereof. Therefore, the vacuum pump 3 of this invention is provided with, a heat-dissipating system to protect the motor. The heat-dissipating system can be of sprinkling type, immersing type or cooling air type as shown respectively in FIGS. 3, 4 and 5. These three types each includes a housing 32 enveloping the vacuum pump 3, wherein the housing 32 of sprinkling type is formed with a water inlet 33 on one side and a water outlet 34 on the other side, whereby water with low temperature directly flows through the inlet 33 into the housing 32 to contact the periphery of the vacuum pump 3 so that the heat is absorbed by the cold water and carried away from the vacuum pump 3. The water then flows through the outlet 34 outside the housing 32. Referring to FIG. 4, in the immersing type, the vacuum pump 3 is immersed in a heat-dissipating flowing liquid which flows into the housing 32 through the inlet 35 to carry away the heat from the vacuum pump 3 and then discharges from the outlet 36. Referring to FIG. 5, in the cooling air type, an exhaust fan 37 is disposed on one side of the housing 32 to blow cold air into the housing 32 to directly contact the vacuum pump 3 and absorb the heat thereof. The hot air is then discharged from the housing 32 by another fan 38 located on the other side of the housing 32. In addition, a condensing pipe 39 is disposed in the housing 32 to enhance the heat-dissipating effect. As a consequence, the motor and other components of the vacuum pump 3 can be maintained at a normal working temperature and the possibility of damage can be minimized. Moreover, as shown in FIG. 6, a condensing pipe 39 can be disposed in the in-coming pipe 30 in front of the intermediate exhausting fan 11 to previously lower the temperature of the waste gas entering the in-coming pipe 30 so that the waste gas going into the vacuum pump 3 will be at a lower temperature to ensure the normal operation of the vacuum pump 3.

The bubble breaker 44 is used to break the waste gas bubbles in the washing tank 4 into many smaller bubbles so that the waste gas can more sufficiently contact with the washing liquid. The distance between the discharging pipe 31 and the bubble breaker 44 depends on the compositions and varieties of the waste gas so that the waste gas bubbles can most sufficiently mix with and react with the washing liquid for achieving better purifying effect. Moreover, on the surface of the washing liquid, the stirring propeller 45 is used to stir the washing liquid, making the same more sufficiently mixed with the air so that a more clean gas can be obtained. The number of the washing tanks 4 can be increased, depending on the compositions and contaminating degree of the waste gas. Wherein the second washing tank 4' is identical to the first one in structure and one difference between them is that the intermediate exhaust fan 11' and vacuum pump 3' of the second washing tank 4' are used to suck the not so dirty waste gas coming from the first washing tank 4. Another difference is that the washing liquid contained in the second washing tank 4' may be different from that of the first washing tank 4. Generally, the washing liquid of the first one may be clean water for removing larger particles of water soluable gas, while the washing liquid of the second one may be sodium carbonate aqueous solution for absorbing and dissolving carbon oil component or other acidic gas components. However, the selection of washing liquid is not specifically limited. In case of burning general garbage, the washing liquids of two washing tanks can be both clean water and in case of waste gas with high oil content, the washing liquids can be both carbonate aqueous solution. Other solutions with even better cleaning effect can also be adopted, and the number of the washing tanks can be two, three, four, etc., depending on the compositions and characters of the waste gas.

After a period of use, the washing liquid can be discharged from the draining pipes 43, 43' for other treatment. Some toxin and dirt can be burned or concentrated or neutralized by neutralizer.

According to the above arrangement, the waste gas-purifying purifying device of this invention is simply structured and can be easily maintained and suitable for general factories, families automobiles or construction sites. In case a long pipe line is required, additional exhaust fans can be provided at suitable intervals to enhance the flowing of waste gas and speed the purifying process.

When the present device needs to be repaired or fails, the stopper board 21 can be opened to discharge the waste gas so as to prevent other relevant machines from stopping.

The present invention can be variously modified without departing from the scope thereof.

I claim:

1. A waste gas purifying device comprising:
   a) a washing tank having a bottom and containing a washing liquid;
   b) a vacuum pump having an inlet adapted to receive waste gas and an outlet;
   c) a discharge pipe operatively associated with the outlet of the vacuum pump, the discharge pipe having an outlet end disposed in the washing tank adjacent to the bottom of the tank;
   d) a bubble breaker disposed on the bottom of the washing tank opposite the outlet end of the discharge pipe;
   e) cooling means operatively associated with the vacuum pump to dissipate heat from the vacuum pump comprising: a housing enveloping the vacuum pump; and a cooling medium circulating through the housing in contact with the vacuum pump; and
   f) an exhaust fan operatively associated with the inlet of the vacuum pump to direct waste gases into the inlet.

2. A device as claimed in claim 1, further comprising a stirring propeller disposed in the washing tank, located near a surface of the washing liquid contained in said washing tank.

3. A device as claimed in claim 1, further comprising a guide pipe operatively associated with the washing tank to guide purified gas out of the washing tank.

4. A device as claimed in claim 1, further comprising several washing tanks disposed in series, and a guide pipe disposed on the last washing tank to guide purified gas out of the last washing tank.

5. The waste gas purifying device of claim 1 wherein the cooling medium is a liquid.

6. The waste gas purifying device of claim 1 wherein the cooling medium is a gas.

7. The waste gas purifying device of claim 6 further comprising: gas circulating means operatively associated with the housing so as to circulate the cooling medium through the housing.

* * * * *